United States Patent [19]
North

[11] Patent Number: 5,617,185
[45] Date of Patent: Apr. 1, 1997

[54] METHOD AND APPARATUS FOR POSITIONING FILM IN A PHOTOGRAPHIC FILM PRINTER

[75] Inventor: Stephen P. North, Rochester, N.Y.

[73] Assignee: Eastman Kodak Company, Rochester, N.Y.

[21] Appl. No.: 335,280

[22] Filed: Nov. 7, 1994

[51] Int. Cl.⁶ .................................................. G03B 27/62
[52] U.S. Cl. ..................................... 355/75; 353/95
[58] Field of Search ............................... 355/75; 353/95; 352/229, 230

[56] References Cited

U.S. PATENT DOCUMENTS

| | | | |
|---|---|---|---|
| 2,783,050 | 2/1957 | Garrison et al. | 279/1 |
| 3,102,448 | 9/1963 | Hammer | 352/229 |
| 3,916,596 | 11/1975 | Hawley . | |
| 4,353,645 | 10/1982 | Kogane et al. | 355/75 |
| 4,803,557 | 2/1989 | Bridges | 358/229 |
| 4,965,631 | 10/1990 | Ozawa | 355/75 |
| 5,453,817 | 9/1995 | Oka et al. | 355/75 |

Primary Examiner—Arthur T. Grimley
Assistant Examiner—David A. Lane
Attorney, Agent, or Firm—Francis H. Boos, Jr.

[57] ABSTRACT

Orientation of a removable film gate with a docking frame is accomplished by a releasable locator connector assembly in conjunction with a force-responsive clamp assembly. The locator connector assembly includes a male connector subassembly on the removable film gate and a female connector subassembly located on the docking frame. A spring-biased threaded screw in the male connector subassembly connects with a tapped end of a locator pin in the female connector subassembly. The threaded screw and tapped locator pin locate each other by a cone-shaped protrusion at the top of the locator pin in conjunction with a recessed area of a locator seat within the male connector subassembly. The force-responsive clamp assembly accepts a tab of the removable film gate when the film gate is pushed into the photographic film printer, and releases the tab when a pulling force is applied to the film gate. The releasable locator connector assembly prevents movement of the film gate relative to the docking frame along each of an X, Y and Z axes, as well as preventing rotation of the film gate about the X and Y axes. The force-responsive clamp assembly prevents rotation of the film gate about the Z axis.

6 Claims, 2 Drawing Sheets

METHOD AND APPARATUS FOR POSITIONING FILM IN A PHOTOGRAPHIC FILM PRINTER

BACKGROUND OF THE INVENTION

1. Technical Field

The present invention is generally related to photographic film printing. More particularly, the present invention is related to the positioning of photographic film for printing within a photographic film printer.

2. Background Art

Modern photographic film printers include a removable film gate for positioning the photographic film for printing. The film gate may be automatic or manual. Either type of film gate shares the same type of docking and orienting system within the photographic film printer that ensures the film lines up with the printing aperture properly. However, many photographic film printers provide little space for the film gate to be inserted and removed, as well as properly oriented. It is often necessary to change the film gate, since a given film gate generally only supports one size of film, for example, 35 mm film. Due to the need to change the film gate and the scant space available in the printer for inserting, removing and orienting the film gate, the placement and orientation of the film gate in an efficient and reliable manner has heretofore been unavailable.

Thus, a need exists for a way to efficiently, reliably and accurately insert and remove, as well as orient, a film gate within a photographic film printer.

SUMMARY OF THE INVENTION

Briefly, the present invention satisfies the need for an efficient, reliable and accurate way to place and orient a film gate within a photographic film printer by providing an easily engaged and disengaged locator connector in conjunction with a force-responsive constraint.

In accordance with the above, it is an object of the present invention to provide apparatus and methods for a photographic film printer allowing a film gate to be efficiently inserted and removed.

It is another object of the present invention to provide apparatus and methods for a photographic film printer allowing a film gate to be reliably inserted and removed.

It is another object of the present invention to provide apparatus and methods for a photographic film printer allowing a film gate to be accurately inserted and removed.

The present invention provides, in a first aspect, apparatus for positioning photographic film for printing, comprising a removable film gate, a docking frame for accepting the removable gate, and a locator connector assembly comprising a first portion coupled to the removable film gate and a second protrusion coupled to the docking frame. Engagement of the locator connector assembly provides alignment of the removable film gate and the docking frame and prevents movement of the moveable film gate relative to the docking frame along each of an X, Y and Z axis. The apparatus may also comprise a force-responsive theta-Z constraint for preventing rotation of the removable film gate about the Z axis relative to the docking frame. The first portion of the locator connector assembly may comprise a male connector subassembly and the second portion may comprise a female connector subassembly.

The present invention provides, in a second aspect, a method for positioning film in a photographic printer including a stationary docking frame, a removable film gate, a locator connector assembly and a force-responsive constraint. The method comprises steps of inserting the removable film gate into the photographic printer adjacent to the stationary docking frame, applying a force in an insertion direction to the removable film gate to engage the force-responsive constraint to restrain rotation of the removable film gate relative to the stationary docking frame, and engaging the locator connector assembly to align the removable film gate with the stationary docking frame to restrain movement of the removable film gate relative to the stationary docking frame. The method may further comprise steps of disengaging the locator connector assembly, applying a force in a removing direction to the removable film gate to disengage the force-responsive constraining, and removing the removable film gate from the photographic printer.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
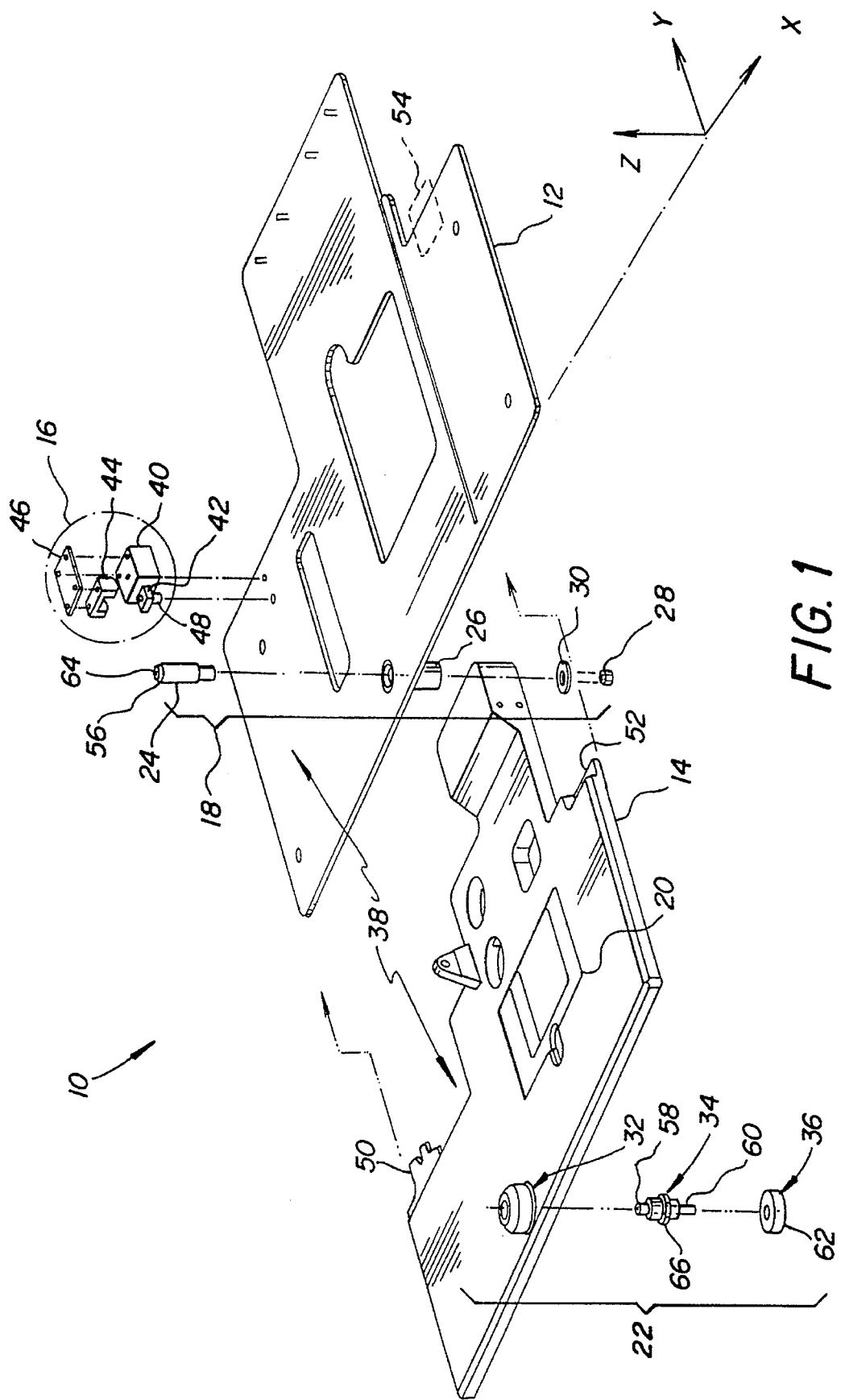
FIG. 1 depicts apparatus for positioning photographic film within a photographic film printer according to the present invention.

FIG. 1 depicts apparatus 10 according to the present invention for positioning photographic film for printing. Although not shown in FIG. 1, it will be understood that apparatus 10 is housed within a photographic film printer that projects the image from a film negative onto print paper, which in turn is then developed, for example, by conventional methods. Apparatus 10 comprises docking frame 12 and removable film gate 14. Connected to docking frame 12 is a clamp assembly 16 and a female connector subassembly 18. Removable film gate 14 comprises printing aperture 20, tab 50 and connected to gate 14 is male connector subassembly 22. Female connector subassembly 18 comprises a locator pin 24, a locator barrel 26, a locator pin retaining screw 28 and associated locator pin retaining washer 30. Male connector subassembly 22 comprises locator bushing 32, locator plunger 34 and locator seat 36. Together, male connector subassembly 22 and female connector subassembly 18 comprise locator connector assembly 38. Clamp assembly 16 comprises base 40, orientation pin acceptor 42, orientation pin 48, clamp block 44 and flexible plate 46. Note that base 40 and orientation pin acceptor 42 are a single part as depicted, but they could be separate and connected.

The interconnection of the various elements of apparatus 10 and the operation thereof will now be described in detail. Removable film gate 14 is inserted into the photographic film printer over docking frame 12, which is preferably a stationary docking frame relative to the printer. Female connector subassembly 18 remains flush with docking frame 12 as removable film gate 14 is being inserted thereover. Female connector subassembly 18 remaining flush with docking frame 12 during insertion provides the clearance necessary. After removable film gate 14 is inserted over docking frame 12, male connector subassembly 22 and female connector subassembly 18 are engaged, providing reliable, efficient and accurate placement of removable film gate 14 relative to docking frame 12. The engagement of male connector subassembly 22 with female connector subassembly 18 prevents movement of the removable film gate 14 relative to docking frame 12 along each of the X, Y and Z axes, as well as preventing rotation of gate 14 relative to frame 12 about the X axis (i.e., the theta-X degree of freedom) and about the Y axis (i.e., the theta-Y degree of freedom).

Prior to or contemporaneous with the engagement of male connector subassembly 22 and female connector subassembly 18, a force in the Y direction applied to removable film gate 14 causes engagement of a tab 50 (shown in more detail in FIG. 2) with clamp assembly 16. Clamp assembly 16 is force-responsive, meaning that it is engaged in response to a pushing force and disengaged in response to a pulling force. The engagement of tab 50 with clamp assembly 16 effectively prevents rotation of removable film gate 14 around the Z axis (i.e., the theta-Z degree of freedom). Although only one clamp assembly 16 is shown in FIG. 1, it will be understood that more than one could be used, for example, a second clamp assembly could be placed in area 54 of docking frame 12. However, such a second clamp assembly need not include an orientation pin, although it could. Base 40 of clamp assembly 16 is secured to docking frame 12 by conventional means. Connected to base 40 is orientation pin acceptor 42. Once pin 48 is placed through orientation pin acceptor 42, clamp block 44 is placed thereover, the space between the legs of clamp block 44 and docking frame 12 being sufficient for tab 50 to enter. Clamp block 44 is secured to the front of flexible plate 46, which in turn is secured to the rear of base 40 by conventional means. Flexible plate 46 provides a spring action and allows clamp block 44 to move in the Z direction when the force is applied to removable film gate 14, such that tab 50 can enter the space between clamp block 44 and docking frame 12.

Figure 2:
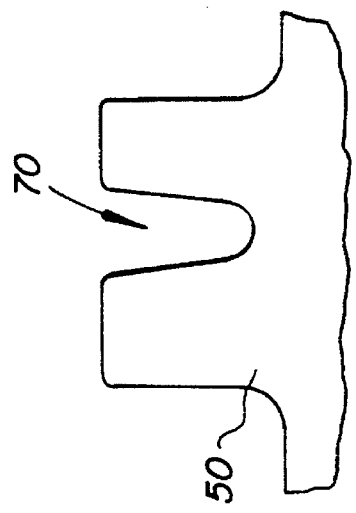
FIG. 2 depicts an exploded view of a portion of the apparatus of FIG. 1.

FIG. 2 depicts tab 50 in greater detail. The profile of tab 50 is low, relative to the rest of removable film gate 14, similar to tab 52 in FIG. 1. Tab 50 fits between clamp block 44 and the top surface of docking frame 12, and around orientation pin 48 via slot 70. Pin 48 also provides added protection against the rotation of removable film gate 14 relative to docking frame 12 about the Z axis.

The operation of locator connector assembly 38 in FIG. 1 will now be described in detail. Locator pin 24 is housed within locator barrel 26, which is fixed to docking frame 12 such that it is flush with the top surface thereof. Locator pin 24 is spring-biased downward, away from docking frame 12. Locator pin retaining screw 28 and locator pin retaining washer 30 hold locator pin 24 within locator barrel 26. The top portion 56 of locator pin 24 is a cone-shaped protrusion, and serves to align female connector subassembly 18 with a mating portion of male connector subassembly 22. Locator bushing 32 of male connector subassembly 22 is connected to the top surface of removable film gate 14. Locator bushing 32 may alternatively be a feature that is part of the body of removable film gate 14, rather than a separate part connected thereto. Knob 58 and the portion above lip 66 of locator plunger 34 extend above locator bushing 32, knob 58 being attached to screw 60 within locator plunger 34. The outside diameters of locator seat 36 is slightly larger than a corresponding hole (not shown) in the bottom of removable film gate 14, so that an interference fit is created, retaining the locator seat within the body of film gate 14. Screw 60 extends through locator seat 36, which includes a recessed area 62 on the bottom thereof for mating with cone-shaped protrusion 56 of locator pin 24. As an operator pushes down and turns knob 58, screw 60 engages a tapped (i.e., made to accept a threaded screw) interior 64 of locator pin 24, bringing locator plunger 34 and locator pin 24 together until lip 66 of locator plunger 34 contacts locator seat 36, which at the same time results in a mating of recessed area 62 with cone-shaped protrusion 56 of locator pin 24. Once male connector subassembly 22 and female connector subassembly 18 are engaged, movement of removable film gate 14 relative to docking frame 12 is prevented in the X, Y and Z directions, as well as constraining the theta-X and theta-Y degrees of freedom thereof. The remaining degree of freedom, i.e., theta-Z, is constrained by clamp assembly 16.

To disengage removable film gate 14 from docking frame 12, knob 58 is rotated in a direction to release screw 60 from the tapped interior 64 of locator pin 24. Once screw 60 is disengaged from interior 64, locator plunger 34 returns to its spring-biased location, as well as locator pin 24 returning to its spring-biased location. A pulling force in the negative Y direction is then applied to removable film gate 14, causing tab 50 to disengage from clamp assembly 16. In this way, removable film gate 14 may be disengaged from locating frame 12, so that, for example, it may be replaced with a different film gate.

Although a specific embodiment for locator connector assembly 38 has been depicted and described herein, the present invention is considered to include any such means providing a reliable, efficient and accurate placement of and connection between removable film gate 14 and docking frame 12, and which also allows the necessary clearance between removable film gate 14 and docking frame 12. It will also be understood that clamp assembly 16 and tab 50 are but one example of a way to restrain rotation of removable film gate 14 about the Z axis. It will also be appreciated that the present invention is applicable to different types of film gates, for example, automatic film gates and manual film gates. One skilled in the art will know that an automatic film gate is one in which photographic film is automatically placed and scanned for necessary adjustments. One skilled in the art will also understand that a manual gate is one in which the photographic film is manually positioned over the printing aperture. Shown in FIG. 1 is an example of a manual film gate.

Figure 3:
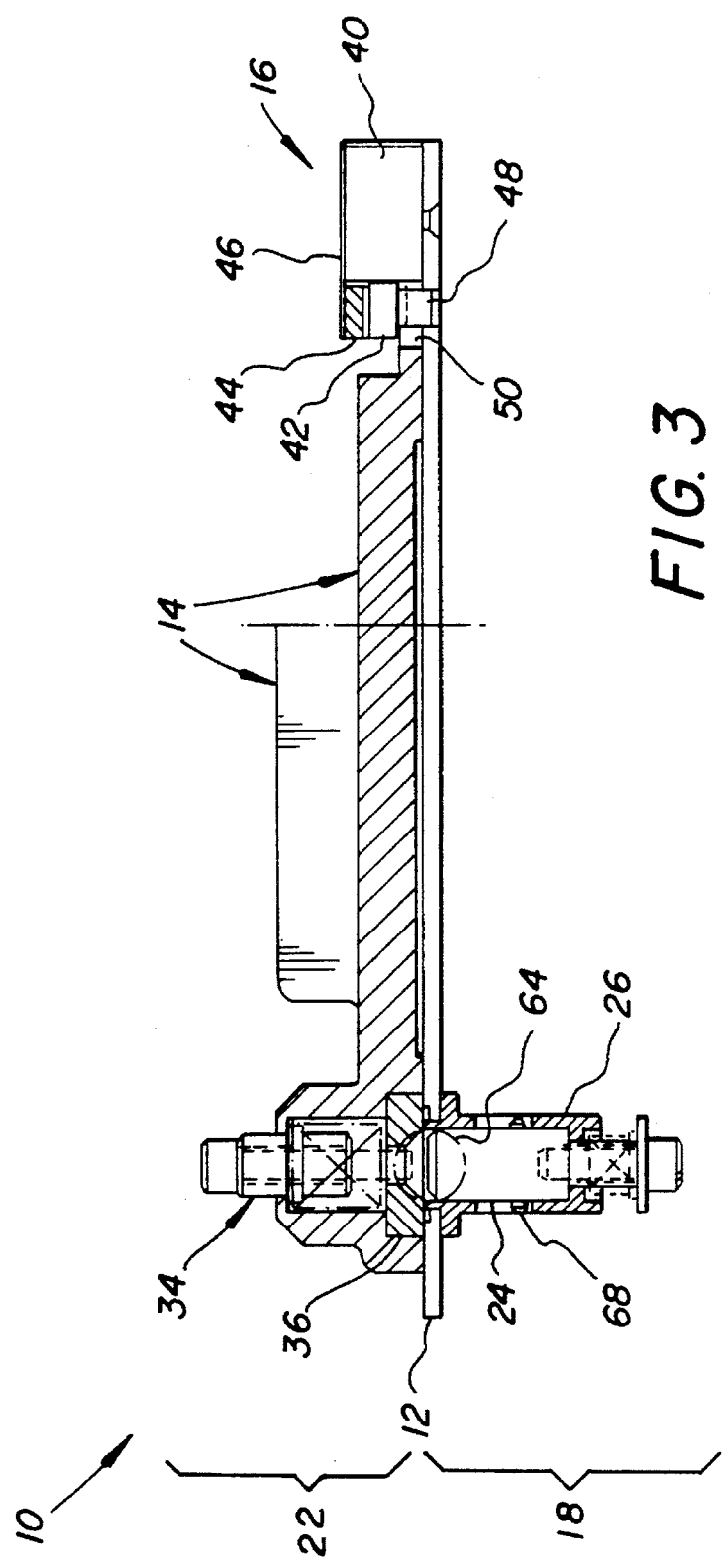
FIG. 3 depicts a cross-sectional view of the apparatus of FIG. 1 in its operational state.

FIG. 3 is a cross-sectional view of the apparatus 10 depicted in FIG. 1. Removable film gate 14 is connected to and aligned with docking frame 12 in FIG. 3. As shown in FIG. 3, male connector subassembly 22 and female connector subassembly 18 are shown in their retracted positions. In addition, an anti-rotation pin 68, a spiral or similar radially compliant pin, is placed through a hole in locator pin 24 to prevent rotation of the removable film gate 14 relative to docking frame 12. Rotation prevention is accomplished by the ends of anti-rotation pin 68 travelling in a slot cut into the interior of locator barrel 26. Anti-rotation pin 68 is an optional accompaniment to prevent rotation during engagement of gate 14 with docking frame 12 and to amplify the rotation inhibiting action of clamp assembly 16. In addition, FIG. 3 depicts tab 50 engaged with clamp assembly 16.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. Apparatus for positioning photographic film for printing, comprising:

a removable film gate having an insertion end and a handling end;

a stationary docking frame for accepting said removable film gate, said docking frame including a back end and a front end;

a locator connector assembly including a male connector subassembly mounted on said handling end of said removable film gate and a female connector subassembly mounted on said front end of said stationary docking frame, wherein said locator connector assembly provides alignment of said removable film gate with said stationary docking frame and prevents movement of said removable film gate relative to said docking frame; and a force-responsive clamp mounted on said back end of said docking frame for restraining movement of said removable film gate at said insertion end relative to said stationary docking frame wherein said male connector subassembly comprises:

a locator plunger housing a threaded screw connected to a knob, wherein said knob provides a means for pushing said threaded screw toward said female connector subassembly and provides a means for rotating said threaded screw;

a locator bushing mounted on said removable film gate at said handling end for housing said locator plunger, said locator plunger being spring biased in a direction away from said stationary docking frame during insertion; and a locator seat including a recessed area for aligning with said female connector subassembly, said threaded screw passing through said locator seat.

2. Apparatus for positioning photographic film for printing, comprising:

a removable film gate having an insertion end and a handling end;

a stationary docking frame for accepting said removable film gate, said docking frame including a back end and a front end;

a locator connector assembly including a male connector subassembly mounted on said handling end of said removable film gate and a female connector subassembly mounted on said front end of said stationary docking frame, wherein said locator connector assembly provides alignment of said removable film gate with said stationary docking frame and prevents movement of said removable film gate relative to said docking frame; and a force-responsive clamp mounted on said back end of said docking frame for restraining movement of said removable film gate at said insertion end relative to said stationary docking frame wherein said female connector subassembly comprises:

a locator pin having a cone-shaped and tapped mating end for aligning and mating said male connector subassembly; and a locator barrel mounted to said stationary docking frame on a surface thereof away from said removable film gate during insertion, said locator barrel housing said locator pin, said locator pin being spring biased in a direction away said removable film gate during insertion.

3. Apparatus for positioning photographic film for printing, comprising:

a removable film gate;

a docking frame for accepting said removable film gate; and a locator connector assembly comprising a first portion coupled to said removable film gate and comprising a male connector subassembly, and a second portion coupled to said docking frame and comprising a female connector subassembly including a locator pin having a protrusion for aligning with said male connector assembly, wherein engagement of said locator connector assembly provides alignment of said removable film gate and said docking frame and prevents movement of said removable film gate relative to said docking frame along each of an X, Y and Z axis.

4. The apparatus of claim 3, wherein said male connector subassembly comprises a locator seat having a recessed area for mating with said protrusion.

5. A method for positioning film in a photographic printer including a stationary docking frame, a removable film gate, a force-responsive constraint, and a locator connector assembly having a male connector subassembly including a threaded male connector coupled to said removable film gate, said male connector being spring-biased in a direction away from said stationary docking frame, and having a female connector subassembly including a tapped female connector coupled to said stationary docking frame, said female connector being spring-biased in a direction away from said removable film gate, said method comprising the steps of:

inserting said removable film gate into said photographic printer adjacent to said stationary docking frame;

applying a force in an insertion direction to said removable film gate to engage said force-responsive constraint to restrain rotation of said removable film gate relative to said stationary docking frame; and engaging said locator connector assembly by rotating said threaded male connector with said tapped female connector thereby to align said removable film gate with said stationary docking frame and to restrain movement of said removable film gate relative to said stationary docking frame.

6. The method of claim 5, wherein said male connector assembly further comprises a recessed alignment area, wherein said female connector assembly further comprises a protrusion for aligning and mating with said recessed alignment area and wherein said step of engaging said male connector subassembly with said female connector subassembly comprises:

inserting said threaded male connector into said tapped female connector; and rotating said threaded male connector to draw said male connector assembly and said female connector assembly together until said protrusion aligns and mates with said recessed alignment area.

* * * * *